United States Patent [19]
Fairbanks

[11] Patent Number: 5,403,382
[45] Date of Patent: Apr. 4, 1995

[54] METHOD AND APPARATUS FOR COPPER PROCESSING

[76] Inventor: Robert L. Fairbanks, #6 Herman La., Yerington, Nev. 89447

[21] Appl. No.: 33,289

[22] Filed: Mar. 16, 1993

[51] Int. Cl.$^6$ .......................... C22B 3/02; C22B 11/06
[52] U.S. Cl. ...................... 75/726; 266/101; 266/170
[58] Field of Search .................... 266/101, 170; 75/726

[56] References Cited

U.S. PATENT DOCUMENTS

| 3,154,411 | 10/1964 | Back | 266/170 |
|---|---|---|---|
| 3,511,488 | 5/1970 | Stubblefield | 266/170 |
| 3,554,516 | 1/1971 | Denny | 266/170 |
| 3,600,156 | 8/1971 | Clapton | 266/170 |
| 3,606,290 | 9/1971 | Ransom | 266/170 |
| 3,806,103 | 4/1974 | Martini | 266/170 |
| 3,893,659 | 7/1975 | Krish | 266/170 |
| 4,225,342 | 9/1980 | Freeman | 75/726 |
| 4,818,499 | 4/1989 | Chantriaux | 266/170 |
| 4,964,622 | 10/1990 | Sherman | 266/170 |
| 5,030,279 | 7/1991 | Krauth | 266/101 |

Primary Examiner—Peter D. Rosenberg
Attorney, Agent, or Firm—Brian C. Kelly

[57] ABSTRACT

Copper is extracted from ore by crushing copper bearing ore followed by heap leaching with sulfuric acid and then moving the resulting solution to a tank containing scrap iron and agitating the solution to precipitate the copper. The tank possesses at least one gate for retaining the scrap iron, which gate is disposed above the bottom of the tank and has a mesh of at least one square inch.

14 Claims, 2 Drawing Sheets

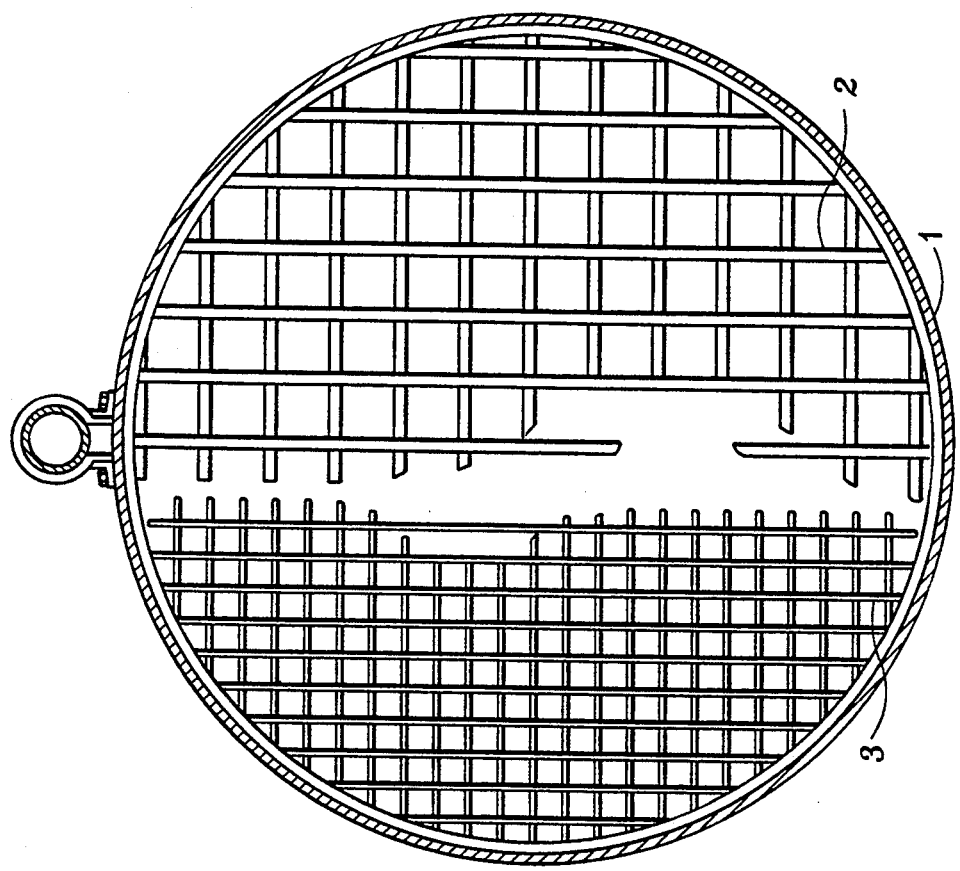
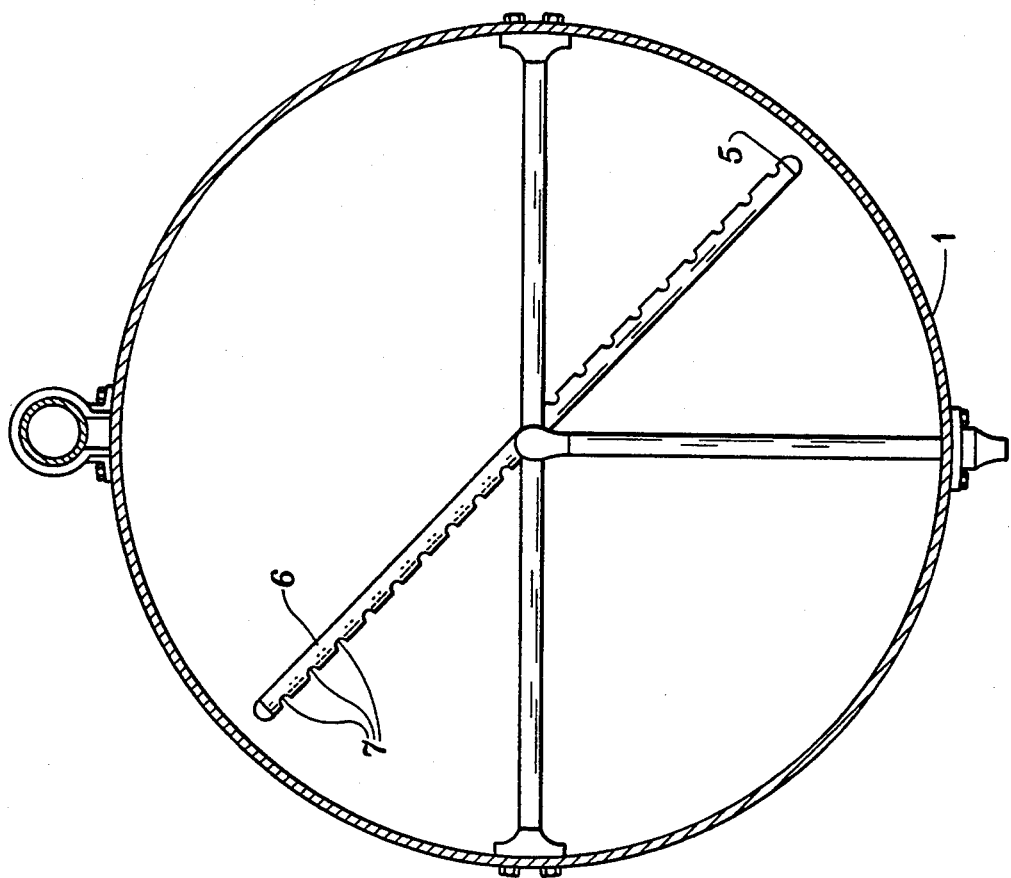

METHOD AND APPARATUS FOR COPPER PROCESSING

BACKGROUND OF THE INVENTION

1. Field Of the Invention

The invention relates generally to the field of copper ore processing.

2. Description of the Prior Art

The prior Art includes the technology of heapleaching. That is saturating a heap or mound of metal bearing ore with Sulfuric Acid $H_2SO_4$ to leach out the copper ions in a aqueous solution of copper sulfate. The prior Art also contemplates that a solution of Copper Sulfate will ionize with Iron (Fe) to create a copper ($Cu°$) precipitate. Actual practice generates 50 to 80% copper. This invention overcomes the problems of the prior Art to generate 99% pure copper precipitate.

SUMMARY OF THE INVENTION

A method of extracting copper from metal bearing ore including the steps of crushing metal ore, heap leaching the ore with a Sulfuric Acid solution to produce an aqueous solution which is deposited in a tank containing Iron and agitating it there to precipitate copper.

This invention includes a tank apparatus having a lower conical portion and one or more grates disposed therein for retaining scrap Iron. It also includes an agitation means for agitating the surface reaction of the copper ions and the Iron.

OBJECTS OF THE INVENTION

It is a first object of the invention to produce high concentration copper precipitate. It is a second object of the invention to provide a system capable of batch or continuous operation.

It is a further object of the invention to provide a substantially closed system to reduce environmental effects.

BRIEF DESCRIPTION OF THE DRAWINGS

FIG. 2 shows a sectional top view of the tank detailing the agitation apparatus.

FIG. 3 shows a sectional top view of the tank one-half showing the upper grate and the other showing the smaller lower grate.

DESCRIPTION OF PREFERRED EMBODIMENTS

Figure 1:
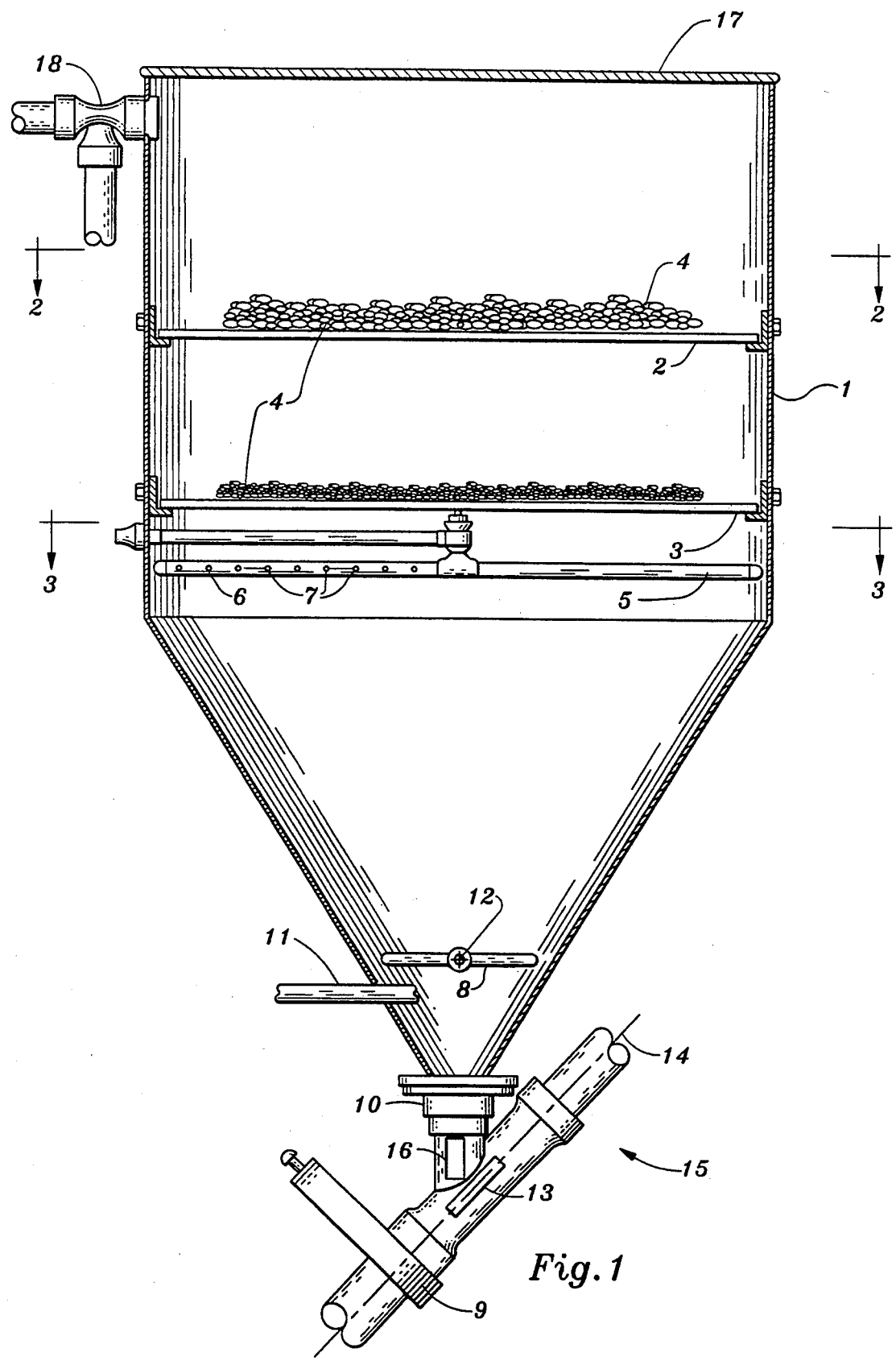
FIG. 1 shows a sectional side view of the tank.

As is common to the Art metal bearing ore is crushed and placed upon a leach pad. The copper is then leached from the ore by ionizing the copper into solution using a Sulfuric Acid ($H_2SO_4$) Solution. In contrast to the prior Art a solution with a Ph value of 1.5 is used versus the common 2 to 2.5. The solution is then put in a Cone shaped tank 1 with an air fight top 17 as shown in FIG. 1. The tank 1 is cylindrical with a frusto conical shaped bottom having 60° sides. In the tank 1 are two annular grates the first grate 2 has a large mesh of 4 to 6 inches and the second grate 3 positioned below the first 2 has a smaller 2 inch mesh as shown in FIG. 3. Bits of scrap iron 4 (Fe) are placed in the tank 1 before the solution enters the tank. The solution fills the tank 1 from fill port 11 until it submerges the Iron 4. By injecting the solution from near the bottom of the tank there is a benefit in increased agitation and the solution interacts with the finest particles of Iron first. An air distributor 5 is positioned below the second grate 3 and includes a centrally pivoted cylindrical tube 6 with multiple air outlet holes 7. The holes 7 are disposed perpendicularly along the cylindrical tube 6 on opposing sides at opposing ends as shown in FIG. 2 to induce a rotation when air pressure is applied. In this fashion a substantially uniform volume of bubbles is dispersed in the lower volume of the tank 1 full of solution. The bubbles provide agitation to increase the copper sulfate iron interaction. They also provide oxygen which contributes to the secondary reactions. The following reactions occur simultaneously:

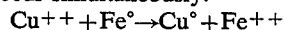
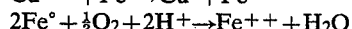
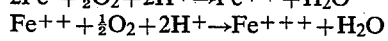

$Cu^{++} + Fe° \rightarrow Cu° + Fe^{++}$
$2Fe° + \frac{1}{2}O_2 + 2H^+ \rightarrow Fe^{++} + H_2O$
$Fe^{++} + \frac{1}{2}O_2 + 2H^+ \rightarrow Fe^{+++} + H_2O$ The copper sulfate gives up its sulfate ion to the Iron and falls to the bottom of the tank. At a position substantially near the bottom of the tank 1 a magnetic grate 8 captures any small Iron pieces or Iron particulates that may escape the two grates above. The magnetic grate 8 is rotatable about its Axis 12 to clear any clogging or the like. There is a second magnet 13 on a line 14 disposed in collector assembly 15 for clearing clogs. Sight Window 16 gives visual evidence of clogging and product production. The copper cement is then removed from the bottom of the tank 1 by dump valves 9 or air lift devices. The copper cement has been found to be extremely high quality, and may be filtered or dried to its powder form for use in powdered metals, paints or wood preservatives and the like. The secondary reactions use up Sulfuric Acid $H_2SO_4$ and Iron $Fe°$, leaving the Iron in solution.

The Agitation process is provided by the rotating Agitation arm 5. This Agitation is important to mixing the solution with the scrap Iron and oxidizing the Iron particles. The steep slopes of the lower tank 1 wall help in directing the copper cement to a central sump 10 where it can be removed.

The magnetic grate 8 serves the sole purpose of capturing smaller pieces of Iron 4 until they are dissolved into solution. All kinds of scrap Iron are anticipated but the impurities associated with some Iron is obviated by using common Bailing wire which tends to be free of paints or hydrocarbons.

Port 18 allows Hydrogen gas produced during the reaction to be drawn off from the head space of the tank 1.

Obviously, many modifications and variations of the present invention are possible in lieu of the above teachings. It is therefore to be understood that within the scope of the appended claims, the invention may be practiced otherwise than as specifically described.

What is claimed and desired to be protected by letters Patent of the United States is:

1. A method of extracting copper from ore comprising the steps of:
   Crushing copper bearing ore;
   heap leaching said ore with a Sulfuric Acid solution, to produce an aqueous solution of copper ions;
   moving said aqueous solution to a tank containing scrap Iron and agitating said aqueous solution to precipitate copper by an agitation means;
   wherein said tank further comprises at least one grate for retaining said scrap Iron at a point above a bottom of said tank, said grate having a mesh of at least one square inch.

2. A method as described in claim 1 wherein said Sulfuric Acid solution has a Ph of less than 2.0.

3. A method as described in claim 2 wherein said agitation means comprises of pivotally mounted cylindrical tube disposed below said grate, said tube comprising at least one hole perpendicular to a central longitudal axis thereof, said hole communicating with the interior thereof; further comprising the step of passing a volume of air through said hole.

4. A method as described in claim 3 wherein said step of passing a volume of air through said hole causes said cylindrical tube to rotate about its pivot.

5. A method as described in claim 4 further comprising the step of magnetically filtering a precipitate falling toward the bottom of said tank by force of gravity by creating a magnetic field to capture Iron by magnetic field means.

6. A method as described in claim 5 wherein said magnetic field means comprises a magnetic grate disposed below said first grate disposed below said first grate in said tank, an across a section f a cone portion thereof comprising a magnetic filed generation means.

7. A method as described in claim 6 further comprising the step of separating a copper precipitate collected on a bottom end of said tank from a solution using a dump valve means.

8. A method as described in claim 7 further comprising the step of separating a copper precipitate collected on a bottom end of said tank from a solution using an air lift means.

9. An apparatus for precipitating high grade copper Cu° from an ionized copper and sulfate solution comprising an annular tank of predominantly cylindrical construction having a conical portion at a bottom end, said conical portion reducing from a diameter of said cylindrical portion to a substantially smaller diameter, the slope of the sides of said conical section being at least 40°, further comprising at least one grate therein disposed in a plane perpendicular to a longitudanal axis of said cylinder proportion of said tank, having a mesh size of at least one square inch for retaining scrap Iron.

10. An apparatus as described in claim 9 further comprising agitation means for disturbing the surface reactions of a solution and said scrap Iron in said tank.

11. An apparatus as described in claim 10 wherein said agitation means comprises a pivotally mounted cylindrical tube disposed below said grate, said tube comprising at least one hole perpendicular to a central longitudinal axis thereof, said hole communicating with the interior thereof.

12. An apparatus as described in claim 11 further comprising a magnetic field means generated about a magnetic grate disposed substantially near said bottom end for retaining Iron particulates and withholding them from said precipitate.

13. An apparatus as described in claim 12 further comprising precipitate evacuation means for separating said precipitate collected at said bottom end of said tank from said solution and said tank.

14. An apparatus as described in claim 13 further comprising a second grate for retaining bits of Iron scrap disposed in a plane perpendicular to said longitudinal axis of said cylindrical tank.

* * * * *